United States Patent
Roy et al.

(10) Patent No.: US 10,985,519 B2
(45) Date of Patent: Apr. 20, 2021

(54) ACTIVE LMA OPTICAL FIBER AND LASER SYSTEM USING THE SAME

(71) Applicant: Institut National D'Optique, Quebec (CA)

(72) Inventors: Vincent Roy, Quebec (CA); Claude Paré, Quebec (CA); Louis Desbiens, Quebec (CA)

(73) Assignee: Institut National D'Optique, Quebec (CA)

( * ) Notice: Subject to any disclaimer, the term of this patent is extended or adjusted under 35 U.S.C. 154(b) by 442 days.

(21) Appl. No.: 15/881,435

(22) Filed: Jan. 26, 2018

(65) Prior Publication Data

US 2018/0375280 A1 Dec. 27, 2018

Related U.S. Application Data

(60) Provisional application No. 62/522,959, filed on Jun. 21, 2017.

(51) Int. Cl.
*H01S 3/067* (2006.01)
*H01S 3/00* (2006.01)
(Continued)

(52) U.S. Cl.
CPC ........ *H01S 3/06733* (2013.01); *H01S 3/0057* (2013.01); *H01S 3/0092* (2013.01); *H01S 3/06716* (2013.01); *G02B 6/02009* (2013.01); *G02B 6/03644* (2013.01); *G02B 6/14* (2013.01); *G02B 6/241* (2013.01); *H01S 3/06704* (2013.01);
(Continued)

(58) Field of Classification Search
None
See application file for complete search history.

(56) References Cited

U.S. PATENT DOCUMENTS

| 8,433,168 B2 | 4/2013 | Filippov et al. |
| 8,532,150 B1 * | 9/2013 | Tong .................. H01S 3/06758 372/6 |

(Continued)

OTHER PUBLICATIONS

"Yb-doped large mode area tapered fiber with depressed cladding and dopant confinement", V. Roy et al., Proc. of SPIE, vol. 10083, Feb. 22, 2017, pp. 1008314-1 to 1008314-6.

*Primary Examiner* — Eric L Bolda
(74) *Attorney, Agent, or Firm* — Brinks Gilson & Lione

(57) ABSTRACT

A laser system based on nonlinear pulse compression and a LMA optical fiber therefor are provided. The LMA optical fiber is configured to amplify seed light pulses and promote the onset of nonlinear spectral broadening. The LMA optical fiber includes a first section having constant core and cladding diameters and receiving and supporting propagation of the light pulses in multiple transversal modes. The first section is configured to suppress high order modes propagating therealong. The LMA optical fiber further includes a tapered second section receiving the fundamental mode from the first section, the core and cladding diameters increasing gradually along said second section so as to provide an adiabatic transition of the fundamental mode. The LMA optical fiber further includes an optional third section having constant core and cladding diameters. Dispersive compression of the light pulses outputted by the LMA optical fiber provides excellent beam quality and high peak powers.

17 Claims, 6 Drawing Sheets

(51) Int. Cl.
*G02B 6/24* (2006.01)
*G02B 6/02* (2006.01)
*G02B 6/14* (2006.01)
*G02B 6/036* (2006.01)

(52) U.S. Cl.
CPC ....... *H01S 3/06745* (2013.01); *H01S 3/06758* (2013.01)

(56) References Cited

U.S. PATENT DOCUMENTS

| | | | |
|---|---|---|---|
| 8,731,358 B2 | 5/2014 | Paré et al. | |
| 8,798,107 B2 | 8/2014 | Deladurantaye et al. | |
| 8,948,219 B2 | 2/2015 | Nodop et al. | |
| 9,300,105 B2 * | 3/2016 | Clowes | B23K 26/36 |
| 2006/0029343 A1 * | 2/2006 | Farroni | G02B 6/024 |
| | | | 385/123 |
| 2011/0081123 A1 * | 4/2011 | Pare | G02B 6/03661 |
| | | | 385/124 |
| 2011/0305251 A1 * | 12/2011 | Tanigawa | G02B 6/03638 |
| | | | 372/6 |
| 2012/0262781 A1 * | 10/2012 | Price | G02B 6/14 |
| | | | 359/341.3 |
| 2015/0138630 A1 * | 5/2015 | Honea | H01S 3/042 |
| | | | 359/341.3 |
| 2019/0163032 A1 * | 5/2019 | Gapontsev | G02F 1/353 |

* cited by examiner

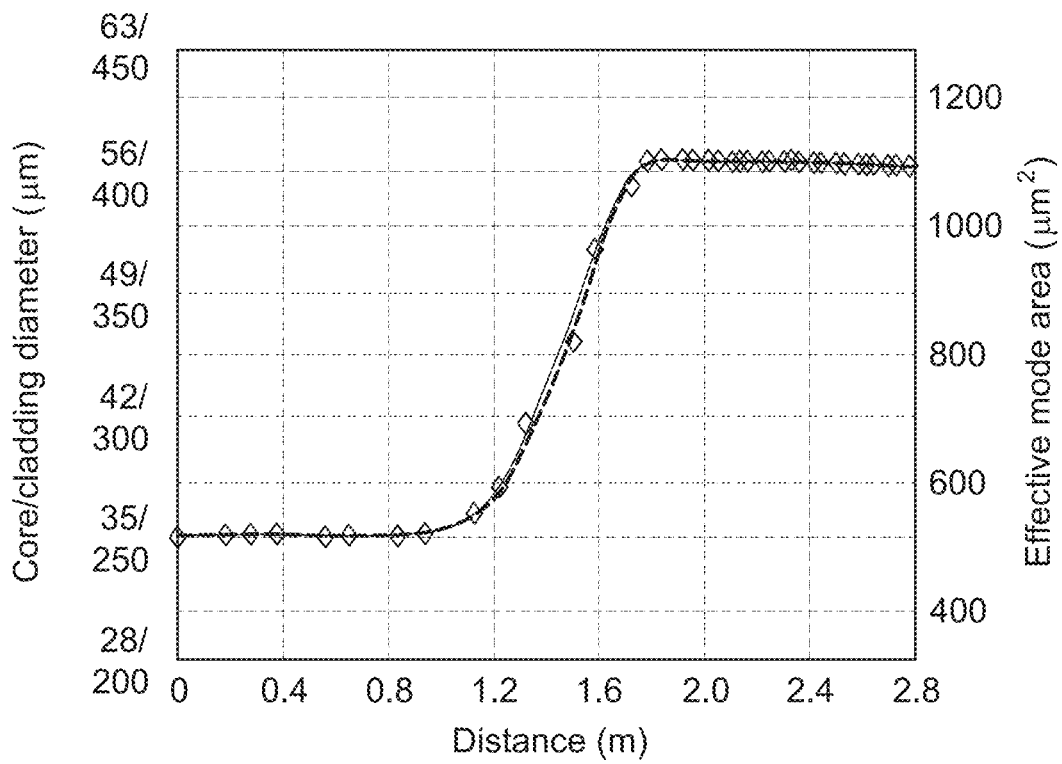
FIG. 3
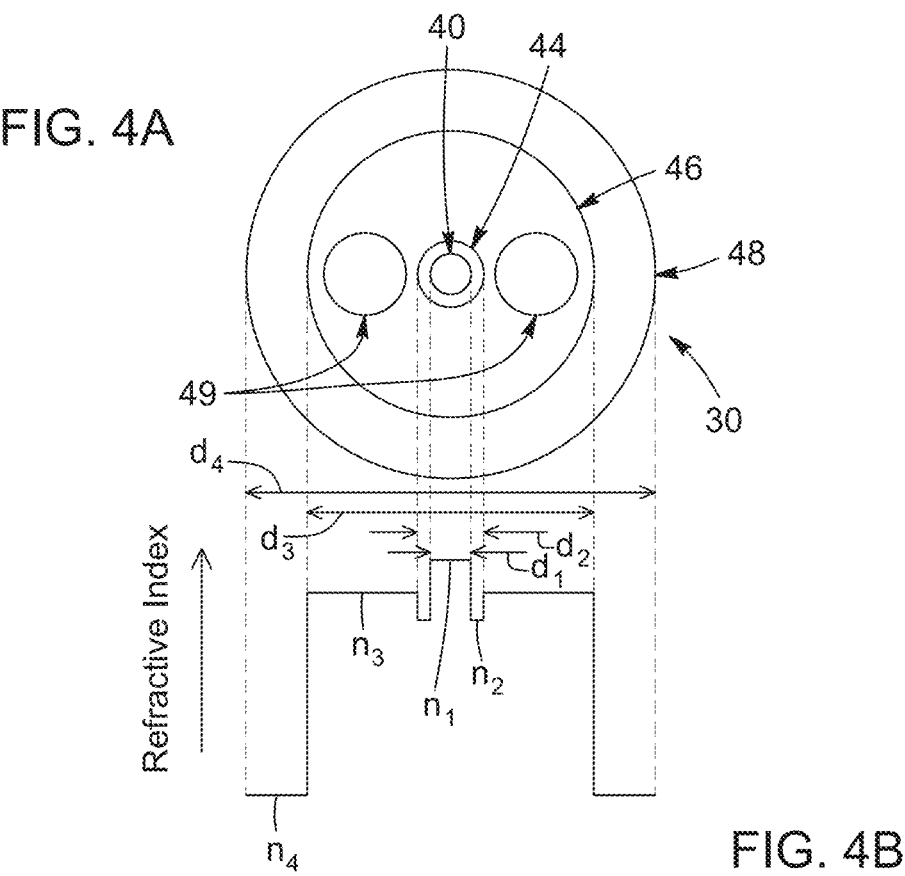
FIG. 4A
FIG. 4B

ACTIVE LMA OPTICAL FIBER AND LASER SYSTEM USING THE SAME

PRIORITY CLAIM

This claims priority to U.S. Provisional Application No. 62/522,659, filed Jun. 21, 2017, and titled ACTIVE LMA OPTICAL FIBER AND NONLINEAR PULSE COMPRESSION LASER SYSTEM USING THE SAME.

TECHNICAL FIELD

The technical field generally relates to laser systems providing ultrashort light pulses and more particularly concerns the use of an active large mode area optical fiber in such systems.

BACKGROUND

Femtosecond lasers are expensive and are sometimes difficult to work with, given the complex technology involved and know-how required. Nonlinear pulse compression is a technique known in the literature for achieving ultrashort pulses. The latter proceeds first from a nonlinear interaction, typically self-phase modulation (SPM), which yields a larger optical bandwidth and resultant frequency upchirp along a seed pulse waveform. This may be accomplished, for instance, through nonlinear pulse amplification along an optical fiber amplifier. Thereafter, the amplified pulse can be compressed to shorter durations using a suitable dispersive optical element. The pulse compression factor then depends on the extent of the broadened spectrum and the ability of the dispersive element to compensate for its chirp.

U.S. Pat. No. 8,948,219 (Nodop et al.) and U.S. Pat. No. 9,300,105 (Clowes et al.) teach similar schemes using optical fibers as the nonlinear amplification medium, where self-phase modulation takes place. The optical fiber typically includes rare-earth dopants (such as ytterbium) so as to provide optical amplification, along with spectral broadening by self-phase modulation. Nodop discloses the use of a single-mode fiber to achieve efficient spectral broadening. While the small-core diameter of single-mode fibers effectively makes operative the spectral broadening due to the high peak intensities reached, limitations arise which make it unlikely in practice to scale peak powers beyond 10's of kW with this technique. Beyond these power levels, the onset of other nonlinear effects (such as stimulated Raman scattering) becomes detrimental to the laser operation. While Clowes mentions the benefits of active optical fibers with larger core diameters, he is silent as to which favorable conditions would be conducive to achieving ultrashort-pulse durations after compression. Clowes instead aims to improve pulse compression by splitting the pulses in two distinct portions (base and surge pulse portions) and further provides details about external means for governing each portion in accordance with heuristic criteria.

There remains a need for active optical fibers with large core diameters configuration providing favorable conditions for nonlinear pulse amplification and subsequent pulse compression.

SUMMARY

In accordance with an aspect of the present description, there is provided a laser system.

The laser system includes a light pulse generator generating light pulses.

The laser system further includes a nonlinear amplification module comprising an active Large Mode Area (LMA) optical fiber having an input end and an output end. The LMA optical fiber has a core having a core diameter and a cladding structure having a cladding diameter. The LMA optical fiber is configured to promote the onset of nonlinear spectral broadening of the light pulses through Self-Phase Modulation at the output end. The LMA optical fiber includes, successively, a first and a tapered second section. The first section receives and supports propagation of the light pulses in multiple transversal modes, which include a fundamental mode and a number of high order modes. The core and cladding diameters are constant along the first section. The first section is further configured to suppress the high order modes propagating therealong. The tapered second section receives the fundamental mode from the first section. The core and cladding diameters increase gradually along the second section so as to provide an adiabatic transition of the fundamental mode along the tapered second section.

The laser system also includes a pulse compressor downstream the nonlinear amplification module and including a dispersive optical element configured to compress the light pulses.

In some implementations, the light pulses generated by the light pulse generator have a duration within a range between about 10 and 100 picoseconds, preferably between about 20 and 50 picoseconds, and further preferably between about 30 and 35 picoseconds. The radiation wavelength of the light pulses may be within a range between about 1020 and 1080 nm. The light pulses generated by the light pulse generator may be substantially Fourier-transform limited.

In some implementations, the light pulse generator may include one of a pulsed laser diode, a mode-locked fiber laser and a diode-pumped solid-state laser.

In some implementations, the LMA optical fiber may further include a third section extending from a larger end of the tapered second section. The core and cladding diameters are constant along this third section and correspond to the core and cladding diameters at the larger end of the tapered second section.

In some implementations, the core of the LMA optical fiber is doped with an active ion dopant along one or more of the first, second and third sections thereof. The active ion dopant is preferably a rare-earth element.

In some implementations, the LMA optical fiber is counter-pumped.

In some implementations, the LMA optical fiber has a transversal refractive index profile including a depression in the cladding structure immediately adjacent the core, and the first section of the LMA optical fiber is coiled according to a bend radius providing the suppressing of the high order modes through bending losses. For example, the core has a refractive index $n_1$ and the cladding structure includes, concentrically from the core outwards:

a depressed-index cladding layer having a refractive index $n_2$;
an inner cladding having a refractive index $n_3$; and
an outer cladding having a refractive index $n_4$;
wherein $n_4 < n_2 < n_3 < n_1$.

In some implementations, the LMA optical fiber is polarization-maintaining, and for example includes stress-applying rods extending longitudinally within the cladding structure in parallel to the core.

In some implementations, the nonlinear amplification module further includes at least one pre-amplifying stage upstream the LMA optical fiber.

In some implementations, the dispersive optical element of the pulse compressor is a volume Bragg grating.

In accordance with another aspect, there is provided a laser system including a laser oscillator generating seed light pulses, and a Large Mode Area (LMA) optical fiber configured to amplify the seed light pulses and to induce a nonlinear spectral broadening of said seed light pulses through Self-Phase Modulation, thereby obtaining amplified spectrally broadened light pulses.

The LMA optical fiber includes:
- a rare-earth doped core and a cladding structure surrounding the core;
- a transversal refractive index profile comprising a depression in the cladding structure immediately adjacent the core;
- a core diameter and a numerical aperture providing multimode guidance of the seed light pulses in a fundamental mode and a number of high order modes; and
- a longitudinal spatial profile defining an input section having a constant input effective mode area, an output section having a constant output effective mode area, and a tapered section therebetween providing an adiabatic transition between the input and output effective mode areas, the input section being coiled according to a bent radius providing a suppression of the high order modes through bending losses while preserving propagation of the fundamental mode.

The laser system further includes a pulse compressor comprising a dispersive optical element configured to compress the amplified spectrally broadened light pulses.

In some implementations, the seed light pulses have a duration within a range between about 10 and 100 picoseconds, preferably between about 20 and 50 picoseconds, and further preferably between about 30 and 35 picoseconds. The radiation wavelength of the seed light pulses may be within a range between about 1020 and 1080 nm. The seed light pulses may be substantially Fourier-transform limited.

In some implementations, the light pulse generator includes one of a pulsed laser diode, a mode-locked fiber laser and a diode-pumped solid-state laser.

In some implementations, the LMA optical fiber is counter-pumped.

In some implementations, the core has a refractive index $n_1$ and the cladding structure comprises, concentrically from the core outwards:
- a depressed-index cladding layer having a refractive index $n_2$;
- an inner cladding having a refractive index $n_3$; and
- an outer cladding having a refractive index $n_4$;
- wherein $n_4 < n_2 < n_3 < n_1$.

In some implementations, the LMA optical fiber is polarization-maintaining, and may include stress-applying rods extending longitudinally within the cladding structure in parallel to the core.

In some implementations, the laser system further includes at least one pre-amplifying stage upstream the LMA optical fiber.

In some implementations, the dispersive optical element of the pulse compressor is a volume Bragg grating.

In accordance with yet another aspect, there is provided a Large Mode Area (LMA) optical fiber for amplifying light pulses, including:
- a rare-earth doped core and a cladding structure surrounding said core;
- a transversal refractive index profile comprising a depression in the cladding structure immediately adjacent the core;
- a core diameter and a numerical aperture providing multimode guidance of the light pulses in a fundamental mode and a number of high order modes; and
- a longitudinal spatial profile defining an input section having a constant input effective mode area, an output section having a constant output effective mode area, and a tapered section therebetween providing an adiabatic transition between the input and output effective mode areas, the input section being coiled according to a bent radius providing a suppression of the high order modes through bending losses while preserving propagation of the fundamental mode.

In some implementations, the LMA optical fiber may be configured to amplify the light pulses and to induce a nonlinear spectral broadening of the seed light pulses through Self-Phase Modulation.

In some implementations, the LMA optical fiber is counter-pumped.

In some implementations, the core has a refractive index $n_1$ and the cladding structure comprises, concentrically from the core outwards:
- a depressed-index cladding layer having a refractive index $n_2$;
- an inner cladding having a refractive index $n_3$; and
- an outer cladding having a refractive index $n_4$;
- wherein $n_4 < n_2 < n_3 < n_1$.

In some implementations, the LMA optical fiber further includes stress-applying rods extending longitudinally within the cladding structure in parallel to the core.

Advantageously, in some implementations the laser system and LMA optical fiber as described herein provide improvements in the performance of nonlinear pulse compression. Embodiments can provide both excellent beam quality and high peak powers after nonlinear amplification and pulse compression. In examples of implementation an effective mode area superior to 1000 μm² in the larger region of the second section of the LMA optical fiber and/or in the third section may be obtained, which allows for the scaling of the output peak power while at the same time preserving a diffraction-limited output (for example $M^2 < 1.2$).

Other features and advantages will be better understood upon reading of embodiments thereof with reference to the appended drawings.

BRIEF DESCRIPTION OF THE DRAWINGS

FIG. 3 is a graph of the core/cladding diameters and effective mode area along a LMA optical fiber in one example of implementation.

FIGS. 4A and 4B respectively show the cross-section and the refractive index profile of a LMA optical fiber provided with a depressed-index cladding layer in accordance with an embodiment.

DETAILED DESCRIPTION

The present description concerns a laser system based on nonlinear pulse compression and a LMA optical fiber for use in such a system.

Laser systems such as described herein may find widespread use in industrial, scientific and medical applications, for instance when intense and energetic ultrashort pulses of light are needed to probe matter or modify material properties within a microscopic volume or during a very short lapse of time (e.g. through multiphoton processes).

Figure 1:
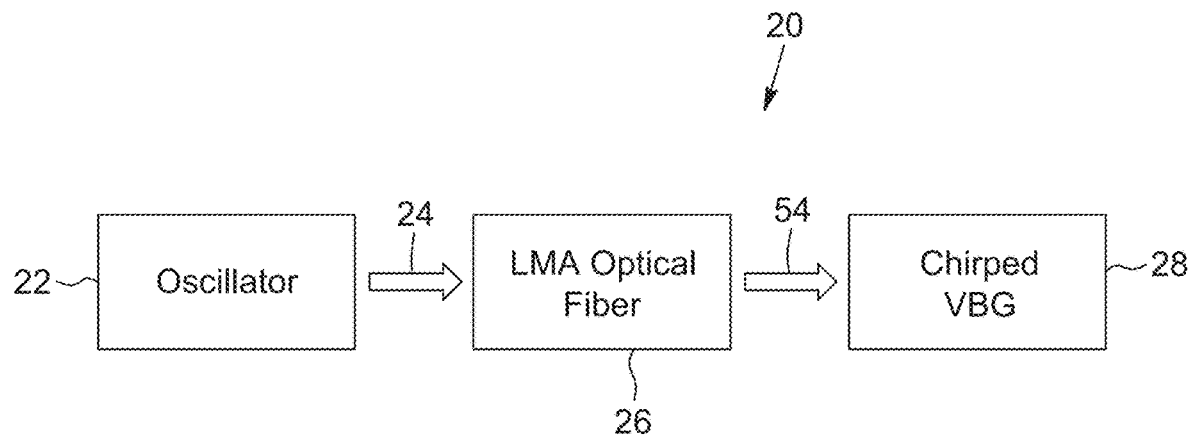
FIG. 1 is a block diagram illustrating a scheme for nonlinear pulse compression.

Referring to FIG. 1, in some implementations, the laser system 20 includes a light pulse generator 22 for generating light pulses 24, a nonlinear amplification module 26 amplifying and spectrally broadening the light pulses 24 into spectrally broadened light pulses 54, and a dispersive pulse compressor 28 for compressing the spectrally broadened light pulses 54.

Figure 2:
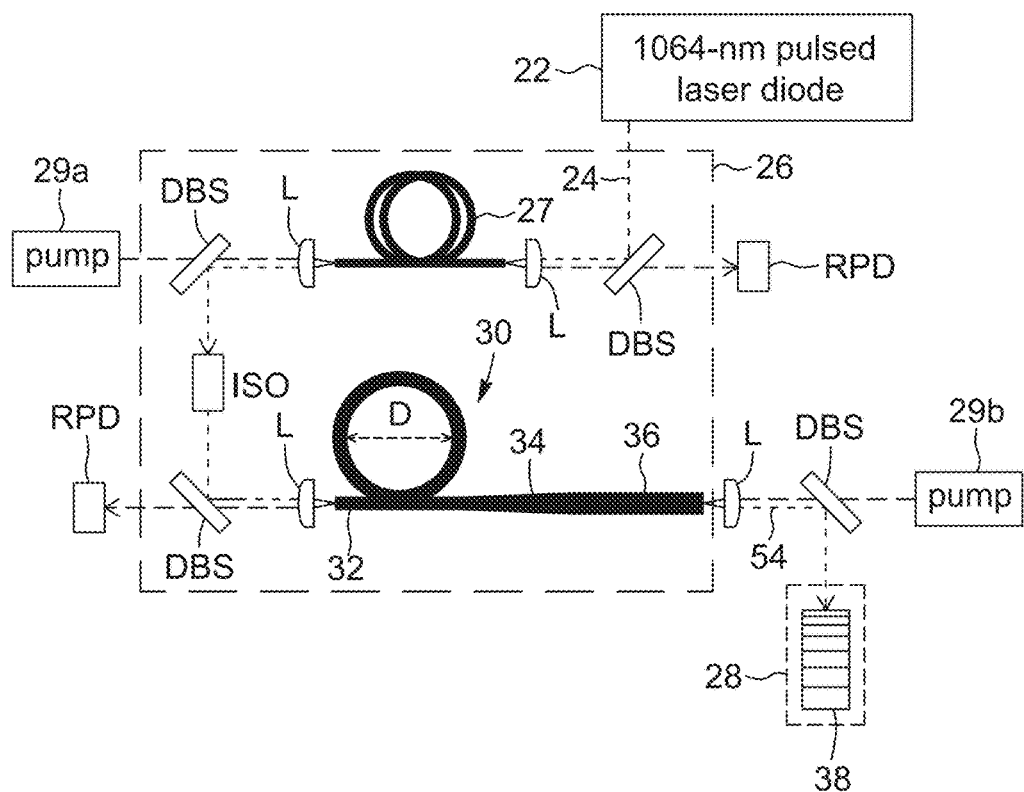
FIG. 2 is a schematic representation of a laser system using a LMA optical fiber according to an embodiment.

Referring to FIG. 2, as mentioned above, an example of a configuration of the laser system 20 is schematically illustrated.

In accordance with some implementations, the light pulse generator 22, also called laser oscillator, can be embodied by a device or combination of devices emitting short optical or light pulses 24, which may be referred to as seed light pulses. The light pulses 24 may be generated from a laser diode using external phase modulation and subsequent spectral filtering (see for example Deladurantaye et al. in U.S. Pat. No. 8,798,107). The seed light pulses 24 could also originate from a gain-switched laser diode, as well as from a mode-locked fiber laser or diode-pumped solid-state laser. The duration of the seed light pulses 24 as emitted from the laser oscillator could typically be selected within a range between about 10 and 100 ps, and preferably in the range between about 20 and 50 ps. In some embodiments, the seed light pulses 24 may have a duration within a range between about 30 and 35 ps and a radiation wavelength within a range between about 1020 and 1080 nm. It is to be noted that the term 37 "about" as used herein is undertood to mean approximately in the region of, and around. When the term "about" is used in relation to a numerical value, it modifies it, for example, above and below by a variation of 10% in relation to the nominal value. This term may also take into account, for example, the experimental error of a measuring apparatus or rounding. The seed light pulses 24 as generated from the light pulse generator are preferably substantially unchirped, i.e. substantially Fourier transform-limited, although small amounts of frequency chirp may be tolerable. In the illustrated configuration, the light pulse is for example embodied by a 1064 nm pulsed laser diode.

The nonlinear amplification module 26 is provided downstream the light pulse generator 22. The nonlinear amplification module 26 may include one of more pre-amplifying stages 27, for example rare-earth doped fiber amplifiers providing a first amplification of the seed light pulses 24. The rare-earth doped fiber amplifiers may be forward or backward pumped by a pump source 29a, for example a 976 nm laser diode.

The nonlinear amplification module 26 then includes an active Large Mode Area (LMA) optical fiber 30. Preferably, the active LMA optical fiber 30 is the last amplification stage of the amplification module 26, if multiple amplification stages are provided.

As known to one skilled in the art, the expression "active fiber" typically refers to an optical fiber which provides amplification of the guided light. Active fibers are typically core-doped with a rare-earth element and pumped with a pump beam from a pump source 29b. The active ion dopant may be a rare-earth element, such as for example erbium (Er), ytterbium (Yb), thulium (Tm), etc. In the illustrated configuration of FIG. 2, the pump source is for example a 976 nm laser diode injected in the LMA optical fiber 30 in a counter-propagating direction to the light pulses 24. Of course, other pumping schemes may be envisioned as well known in the art.

Figure 2A:
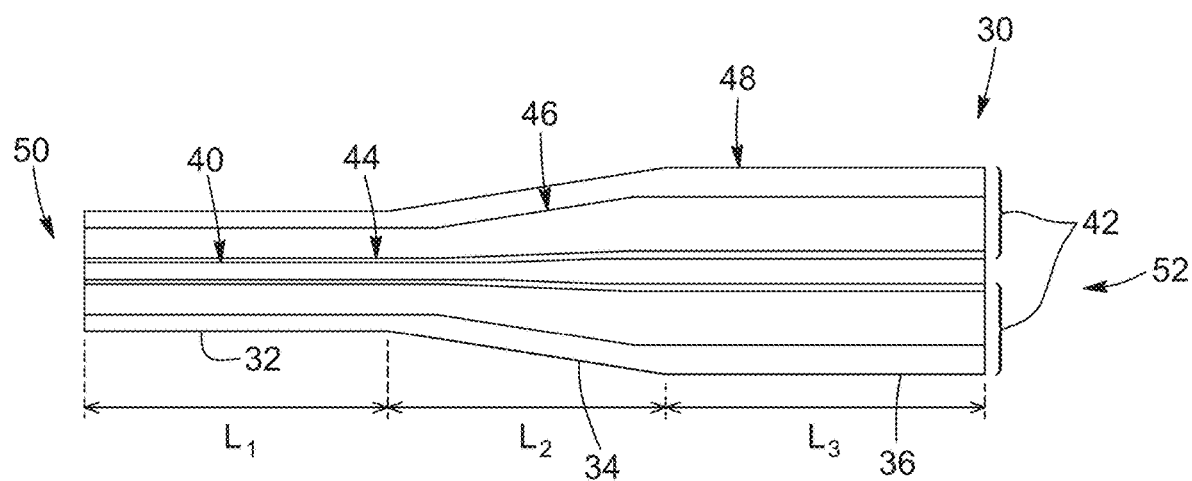
FIG. 2A is a diagram showing a longitudinal cross-section of the LMA optical fiber.

Still referring to FIG. 2 and with additional reference to FIG. 2A, the LMA optical fiber 30 includes a core 40 having a core diameter and a cladding structure 42 having a cladding diameter. It will be readily understood that the cladding structure 42 may include a plurality of cladding layers, and that the cladding diameter may be embodied by the width of one of those cladding layers, typically the cladding layer providing light guidance to the pump beam (inner cladding 46 in the embodiments illustrated herein and explained further below).

The LMA optical fiber has an input end 50 on the side of the light pulse generator 22, and an output end 52 on the side of the pulse compressor 28. In-between, in the illustrated embodiment, the LMA optical fiber 30 successively includes a first or input section 32, a tapered second section 34 and a third or output section 36. The core and cladding diameters are constant along each of the first and third sections 32 and 36, and define respectively a constant input effective mode area, and a constant output effective mode area. The output effective mode area is larger than the input effective mode area. The expression "effective mode area is understood in the context of the present description to refer to a quantitative measure of the area, along the transverse plane of the LMA optical fiber, which is effectively occupied by the fundamental mode. Furthermore, the expression "tapered" used herein refers to the variation in diameter of the LMA optical fiber along the second section 34. The core and cladding diameters increase gradually along the tapered second section 34, providing an adiabatic transition between the input and output effective mode areas. One skilled in the art will readily understand that the expression "adiabatic" refers to a slow variation of the field amplitude of the fundamental mode so that coupling to high order modes is substantially avoided. In some variants, the third section 36 may be omitted without departing from the scope of the invention, in which case the output end 52 is defined by the larger extremity of the tapered second section 34. The first, second and third sections 32, 34, 36 may have different lengths, respectively labelled $L_1$, $L_2$ and $L_3$ on FIG. 2A.

The first section 32 receives and supports the propagation of the seed light pulses 24 in multiple transversal modes, which include a fundamental mode and a number of high order modes (HOMs). The diameter of the core 40 is preferably large enough for the fundamental mode to benefit from a substantially large input effective mode area compared to a typical single-mode fiber, whereas the numerical aperture NA (with $NA^2=n_1^2-n_2^2$, where $n_1$ is the refractive index of the core and $n_2$ is the refractive index of the innermost cladding layer) should be low enough to minimize the number of supported HOMs. An optical fiber meeting such conditions is what is generally understood as a LMA optical fiber by persons skilled in the art. It is however to be understood that the core numerical aperture may not be set to arbitrarily small values as this may lead to excessive losses from fiber bending and/or small fabrication imperfections. Numerical apertures of LMA optical fibers have typical values between about 0.05 and 0.07, although it can be made somewhat smaller or larger.

The first section 32 of the LMA optical fiber 20 is configured to suppress the high order modes propagating therealong, so that the tapered second section 34 receives from the first section 32 only the light pulses carried by the fundamental mode. In one embodiment, HOMs suppression is achieved through bend-induced losses enhanced by the provision of a reduced-index cladding layer immediately surround the core.

Referring to both FIGS. 2A and 4A, there is shown an example of a cladding structure 42 of a LMA optical fiber 30 according to one embodiment. In such an embodiment, the core has a refractive index $n_1$ and diameter $d_1$ and the cladding structure 42 includes a thin depressed-index cladding layer 44 immediately surrounding the core 40, having a diameter $d_2$ and a refractive index $n_2$, the latter being lower than the refractive index of the core ($n_2<n_1$) such as to enable total internal reflection guidance within the core 40. The depressed-index cladding layer 44 is surrounded by an inner cladding 46 having a diameter $d_3$ and refractive index $n_3$, the latter being larger than the refractive index of the depressed-index cladding layer 44 ($n_3>n_2$) but lower than the refractive index of the core 40 ($n_3<n_1$). The inner cladding 46 is surrounded by an outer cladding 48 having a diameter $d_4$. The outer cladding 48 usually consists of a fluorine-doped silica glass layer, of a dual-layer fluoroacrylate polymer coating or of a combination of both, the latter having a low enough refractive index $n_4$ so as to yield high numerical aperture (typically $\geq 0.22$ for fluorine-doped glass or $\geq 0.46$ for fluoroacrylate polymers) for guiding the pump beam launched in the inner cladding 46 to invert the rare-earth ions dopants in the core 40. Optionally, the LMA optical fiber 30 may additionally include stress-applying rods 49 so as to induce stress birefringence and thereafter preserve or maintain the linear polarizations of lightwaves along the optical fiber, as known in the art as a polarization-maintaining optical fiber. The transversal refractive index profile of such a LMA optical fiber 30 is shown in FIG. 4B, where it can be seen that $n_4<n_2<n_3<n_1$.

Figure 5:
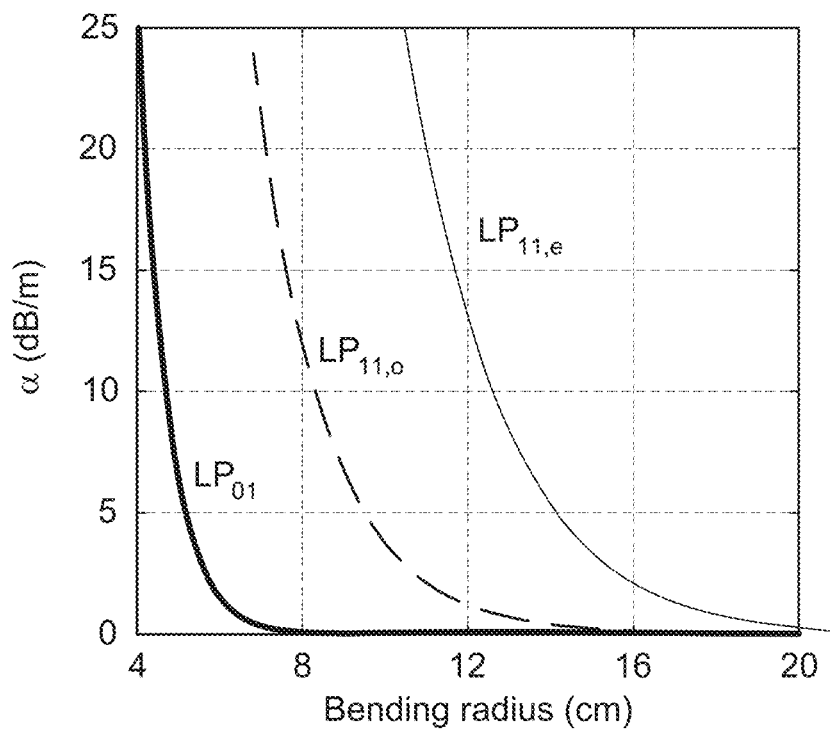
FIG. 5 is a graph of the bend-induced propagation losses of linearly-polarized $LP_{01}$ and $LP_{11}$ modes in 35/250 μm section of a test LMA optical fiber as a function of the bending radius.

A feature of such a configuration is the index depression in the cladding structure 44 immediately adjacent the core 40, which is instrumental in suppression of HOMs along the first section 32. As one skilled in the art would readily understand, HOMs suppression through bend-induced loss may be enhanced by coiling or bending the first section 32 of the LMA optical fiber 30, as the evanescent fields of HOMs then extend further beyond the depressed-index cladding layer 44, thus lowering the effective numerical aperture of HOMs because of the greater overlap with the inner cladding 46. In such implementations, the first section 32 of the LMA optical fiber 30 is therefore coiled according to a bend radius providing this suppression of the high order modes through bending losses. As one skilled in the art will readily understand, the thickness and depth of the depressed-index cladding layer may be engineered for optimal discrimination between linearly-polarized $LP_{01}$ and $LP_{11}$ modes in the first section of the optical fiber, and as such, are intimately tied to the core diameter and core NA. Preferably, the index depression relative to the refractive index of the inner cladding 46 and the bend radius may be designed so as to achieve differential propagation losses between linearly-polarized $LP_{01}$ and $LP_{11}$ modes exceeding 10 dB/m in the first section 32 of the LMA optical fiber. Referring to FIG. 5, there is shown the bend-induced propagation losses of linearly-polarized $LP_{01}$ and $LP_{11}$ modes in the first section of a LMA optical fiber having a core to cladding diameter ratio of 35/250 µm as a function of the bending radius. It can be seen that in this example, differential bending loss between modes larger than 10 dB/m are readily achieved with coiling diameters smaller than about 16 cm.

It is to be noted that the enhanced bend-induced losses attributed to the depressed-index cladding layer are not based on a resonant coupling of HOMs to the cladding structure. Instead, suppression of HOMs becomes simply more efficient once the fiber is coiled, as the evanescent field of HOMs extends further beyond the depressed-index cladding layer, thus lowering the effective numerical aperture seen by HOMs because of a greater overlap with the inner cladding. More information on such a depressed-index cladding layer may be found in U.S. Pat. No. 8,731,358 (Paré et al), the entire contents of which is incorporated herein by reference.

It will further be understood by one skilled in the art that other HOMs suppressing configurations may be considered, such as for example configurations based on HOMs delocalization or confined doping, both of which results in enhanced modal discrimination because of the poor overlap of HOMs with the doped core region.

Referring back to FIGS. 2 and 2A, the adiabatic transition of the mode field in the tapered second section 34 of the LMA optical fiber 30 preferably preserves single-mode propagation towards the larger end of the LMA optical fiber 30. The core and cladding diameters of the LMA fiber increase gradually along the tapered second section 34 so as to provide an adiabatic transition of the fundamental mode. In operation, therefore, the seed light pulses 24 are launched into the LMA optical fiber 30 at the input end 50, in the first section 32 where HOMs are suppressed and the fundamental mode is guided by total internal reflection along the core 40. Adiabatic transition of the mode field in the tapered second section 34 thereafter substantially preserves single-mode amplification towards the larger end of the LMA optical fiber, whereby the light pulses that comes out at the output end 52 benefit from an increased mode area.

The core 40 of the LMA optical fiber 30 is preferably doped with the one or more active ion dopant along one or more of the first, second or third sections 32, 34 and 36 of the LMA optical fiber 30. In typical implementations, the LMA optical fiber is manufactured from a single drawing process and all sections thereof therefore have the same composition. As known to those skilled in the art, doping provides amplification of the travelling light pulses 24 as they propagate among the LMA optical fiber.

The LMA optical fiber 30 may be configured to promote the onset of nonlinear spectral broadening of the light pulses 24 through Self-Phase Modulation (SPM) at its output end 52. In some implementations, the energy levels reached in the LMA optical fiber are sufficient for SPM-induced spectral broadening to occur as a result of nonlinear pulse propagation along the LMA optical fiber. By way of example, the results summarized in the table below were obtained in one experimental implementation of the present laser system, using the configuration illustrated in FIG. 2:

|  | Laser oscillator | LMA optical fiber | Compressor |
| --- | --- | --- | --- |
| Pulsewidth | ~35 ps | ~35 ps | ~1-2 ps |
| Pulse energy | <10 nJ | ~50 µJ | ~20-40 µJ |
| Peak power | <1 kW | ~1-2 MW | ~10-20 MW |

It is to be noted that in this experiment, the core/cladding diameter ratio was 35/250 µm in the first section 32 and 56/400 µm in the third section 36. The variation of the effective mode area along the LMA optical fiber is shown in FIG. 3.

Figure 6:
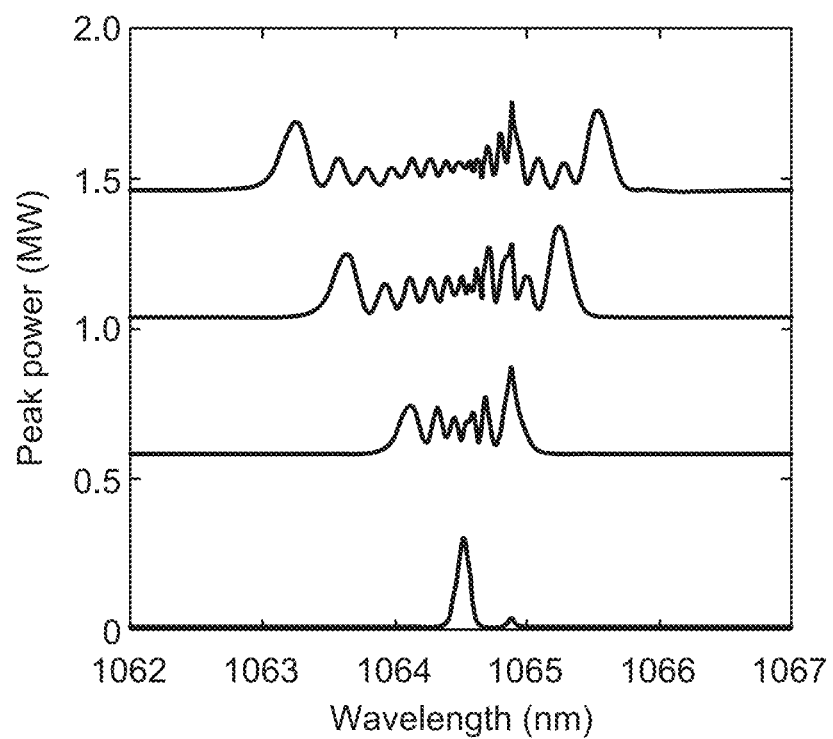
FIG. 6 is a graph of the SPM-broadened optical spectra through nonlinear amplification of short pulses for different peak powers in the test LMA optical fiber.
Figure 7:
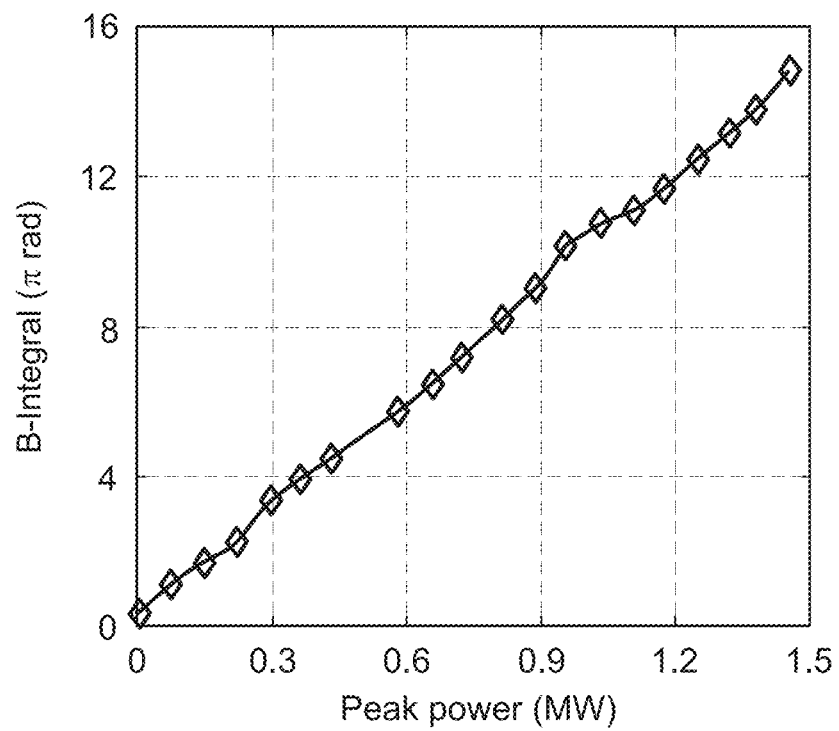
FIG. 7 is a graph of the B-integral as a function of peak power following nonlinear pulse amplification in the test LMA optical fiber (as retrieved from RMS width of SPM-broadened optical spectra).
Figure 8:
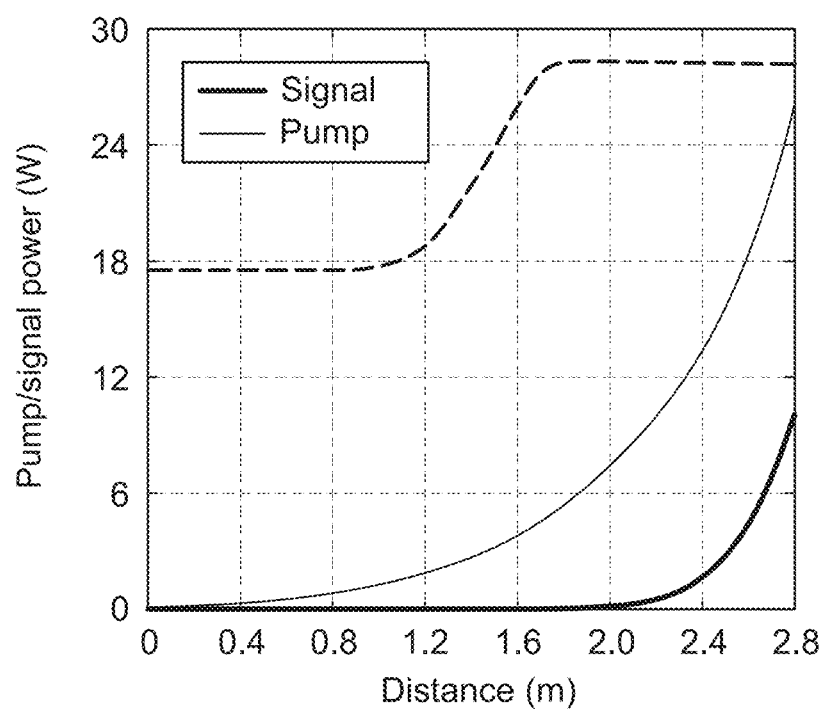
FIG. 8 is a graph of the signal (forward) and pump (backward) power along the test LMA optical fiber (shown schematically by the dashed line) according to one embodiment.
Figure 9:
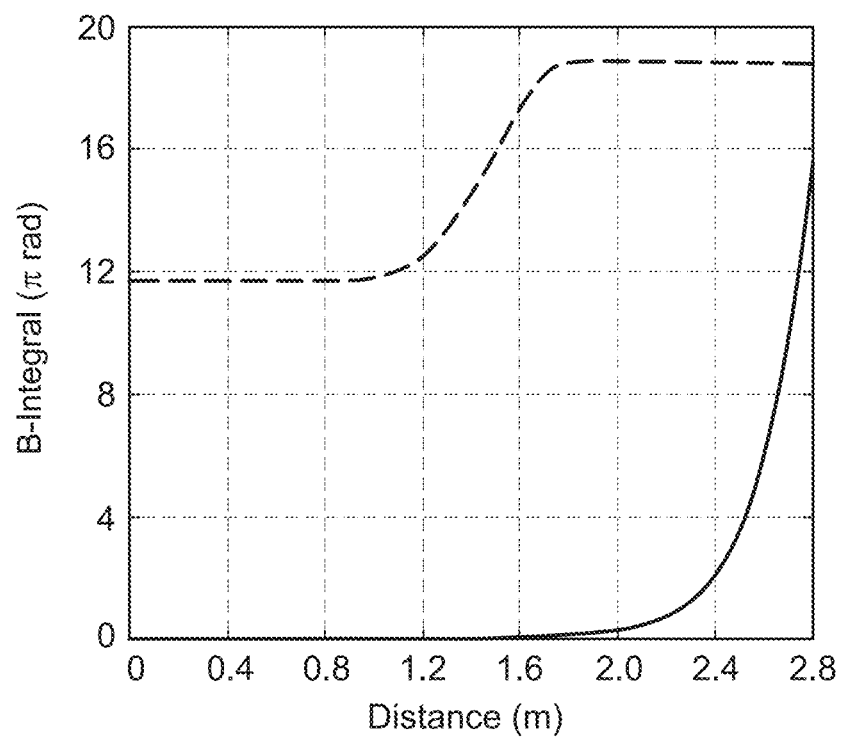
FIG. 9 is a graph of the B-integral along the test LMA optical fiber (shown schematically by the dashed line) according to one embodiment.

As illustrated in FIG. 6, broadening factors as large as 50× the initial bandwidth were measured. A peak nonlinear phase shift (or B-integral, as known by persons skilled in the art) close to 15π radians were obtained, as shown in FIG. 7. In this implementation the LMA optical fiber was counter-pumped and operated at a very high gain (between about 30-50 dB), such that most of the accumulated nonlinear phase takes place substantially at the end of the third section of the LMA optical fiber, where the effective mode area is the largest (see FIGS. 8 and 9). In this manner, much higher peak powers (>1 MW) may be achieved than with conventional LMA fibers differing from the LMA optical optical fiber described herein. Indeed, deleterious nonlinear effects such as stimulated Raman scattering, that would otherwise impair the amplifier efficiency, can be avoided. Counter-pumping of the LMA optical fiber can be advantageous to optimize the amplifier gain at the end of the third section. It is to be noted that the SPM-broadened spectra reported herein shows no hint of simultaneous XPM process with presumed HOMs, which constitutes strong evidence for single-mode propagation along the LMA optical fiber and bodes well for subsequent pulse compression.

Figure 10:
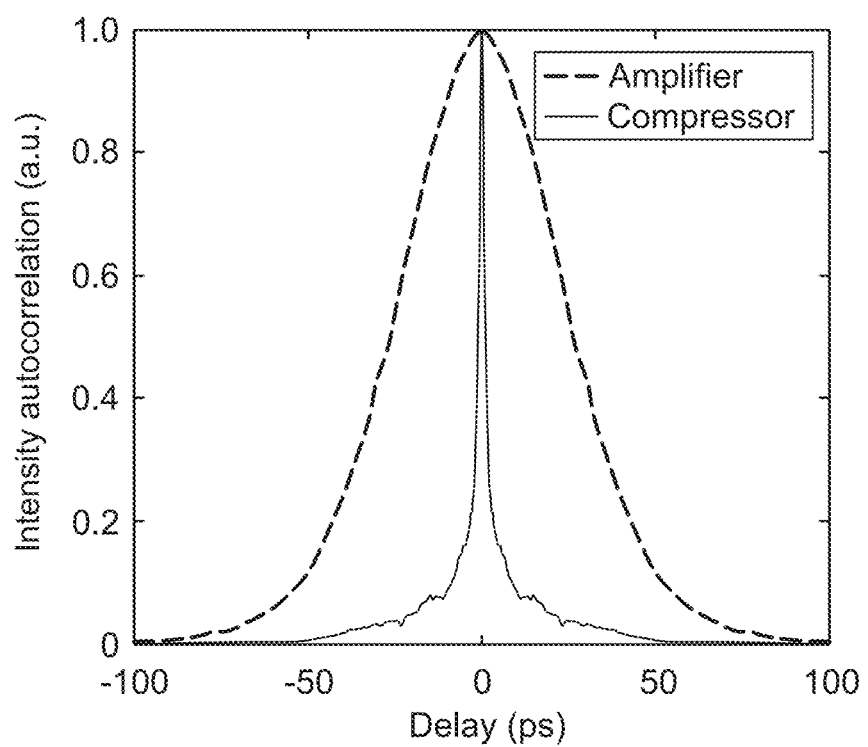
FIG. 10 is a graph of the intensity autocorrelations of optical pulses after amplification in the test LMA optical fiber (dashed line) and subsequent compression using a chirped VBG (straight line), with a compression factor close to 25×.

Referring back to FIG. 2, the laser system 20 further includes a pulse compressor 28 downstream the nonlinear amplification module 26. The pulse compressor 28 includes a dispersive optical element 38 configured to compress the spectrally broadened light pulses 54. The dispersive optical element 38 may for example be embodied by a diffraction grating pair, or a chirped volume Bragg grating (VBG). VBGs may be of special interest in some implementations as they are simple to use and require less space than grating pairs. In the experiment reported above, pulse compression factors as high as 25× have been demonstrated, yielding pulse durations (FWHM) after compression close to 1.5 ps (see FIG. 10). Such a compression factor is estimated to yield a tenfold increase in peak power (~10-20 MW) after pulse compression, thus rivaling with laser systems based on chirped-pulse amplification (CPA). The intensity autocorrelation trace of FIG. 10 shows a fraction of the energy is shed in the pulse pedestal upon compression. Indeed, the chirped VBG only compensates for the linear part of the frequency upchirp, which corresponds roughly to the central portion of the spectrally broadened light pulses 54, whereas SPM-induced time-dependent phase-shift yields nonlinear chirp at the pulse leading/trailing edges (the latter is well known to persons skilled in the art). The dispersive rate of the chirped VBG used to perform compression in this case is ~8.4 ps/nm. It is nonetheless possible to contemplate other embodiments where dispersive rates between about 0.5-50 ps/nm would be appropriate, depending on the duration of the seed optical pulses and the extent of the induced spectral broadening. As a guideline, the following formula is provided to convey a sense of the dispersion D (in ps/nm) needed to achieve near optimal pulse compression:

$$D = \frac{\pi}{4\ln 2} \cdot \frac{c}{\lambda^2} \cdot \frac{T_{FWHM}^2}{\varphi_{MAX}}$$

where c is the speed of light in vacuum, λ is the laser wavelength, $T_{FWHM}$ the duration of the seed light pulses (at FWHM) generated by the oscillator (assuming temporal pulse broadening due to dispersion in the successive fiber amplifier stages is negligible) and $\varphi_{MAX}$ is the SPM-induced peak nonlinear phase accumulated along the LMA optical fiber.

It is to be noted that as pulse compression yields durations below a few picoseconds, modal dispersion may come into play and likely spoil pulse compression unless single-mode guidance is effectively enforced. Modal dispersion in multimode fibers generally results in a walk-off between different propagation modes. Given that LMA fibers are inherently multimode (or few-moded as sometimes referred to), without HOMs suppression, the output of the LMA fiber would be expected to spread over multiple time-delayed sub-pulses. For instance, differential group delay between linearly-polarized $LP_{01}$ and $LP_{11}$ modes along a LMA optical fiber having similar attributes as the one considered herein ranges roughly between 0.3-0.5 ps/m. Considering that the amplifier fiber length may vary in practice between roughly 2 to 6 m (depending upon the pump/signal wavelengths and fiber parameters), group delays (or walk-off) of the same order or even greater than actual pulse durations as demonstrated after compression would be expected at the amplifier output. Sub-optimal pulse compression may therefore result from modal dispersion, with pulse durations longer and/or pedestals larger than expected, and ultimately lower peak powers.

It will be readily understood that the laser system described herein may include additional optical, electrical or mechanical components as will know in the art. By way of example, the system of FIG. 2 includes optical components such as dichroic beam splitters DBS, an optical isolator ISO, residual pump dumps RPDs and lenses L. Any other components directing, separating, shaping focusing, filtering, or otherwise acting on a light beam can also be provided.

Of course, numerous modifications could be made to the embodiments described above without departing from the scope of the present invention.

The invention claimed is:
1. A laser system comprising:
a laser oscillator generating seed light pulses;
a Large Mode Area (LMA) optical fiber configured to amplify the seed light pulses and to induce a nonlinear spectral broadening of said seed light pulses through Self-Phase Modulation, thereby obtaining amplified spectrally broadened light pulses, the LMA optical fiber comprising:
a rare-earth doped core and a cladding structure surrounding said core;
a transversal refractive index profile comprising a depression in the cladding structure immediately adjacent the core;

a core diameter and a numerical aperture providing multimode guidance of the seed light pulses in a fundamental mode and a number of high order modes, said core diameter being at least 35 μm; and a longitudinal spatial profile defining an input section having a constant input effective mode area, an output section having a constant output effective mode area, and a tapered section therebetween providing an adiabatic transition between the input and output effective mode areas, the input section being coiled according to a bent radius providing a suppression of the high order modes through bending losses while preserving propagation of the fundamental mode; and a pulse compressor comprising a dispersive optical element configured to compress the amplified spectrally broadened light pulses.

2. The laser system according to claim 1, wherein the seed light pulses have a duration within a range between about 10 and 100 picoseconds.

3. The laser system according to claim 1, wherein the seed light pulses have a duration within a range between about 20 and 50 picoseconds.

4. The laser system according to claim 1, wherein the seed light pulses have a duration within a range between about 30 and 35 picoseconds and a radiation wavelength within a range between about 1020 and 1080 nm.

5. The laser system according to claim 1, wherein the seed light pulses are substantially Fourier-transform limited.

6. The laser system according to claim 1, wherein the light pulse generator comprises one of a pulsed laser diode, a mode-locked fiber laser and a diode-pumped solid-state laser.

7. The laser system according to claim 1, wherein the LMA optical fiber is counter-pumped.

8. The laser system according to claim 1, wherein the core has a refractive index $n_1$ and the cladding structure comprises, concentrically from the core outwards:
a depressed-index cladding layer having a refractive index $n_2$;
an inner cladding having a refractive index $n_3$; and
an outer cladding having a refractive index $n_4$;
wherein $n_4 < n_2 < n_3 < n_1$.

9. The laser system according to claim 1, wherein the LMA optical fiber is polarization-maintaining.

10. The laser system according to claim 9, wherein the LMA optical fiber further comprises stress-applying rods extending longitudinally within the cladding structure in parallel to the core.

11. The laser system according to claim 1, further comprises at least one pre-amplifying stage upstream the LMA optical fiber.

12. The laser system according to claim 1, wherein the dispersive optical element of the pulse compressor is a volume Bragg grating.

13. A Large Mode Area (LMA) optical fiber for amplifying light pulses, comprising:
a rare-earth doped core and a cladding structure surrounding said core;
a transversal refractive index profile comprising a depression in the cladding structure immediately adjacent the core;
a core diameter and a numerical aperture providing multimode guidance of the light pulses in a fundamental mode and a number of high order modes, said core diameter being at least 35 μm; and
a longitudinal spatial profile defining an input section having a constant input effective mode area, an output section having a constant output effective mode area, and a tapered section therebetween providing an adiabatic transition between the input and output effective mode areas, the input section being coiled according to a bent radius providing a suppression of the high order modes through bending losses while preserving propagation of the fundamental mode.

14. The LMA optical fiber according to claim 13, said LMA optical fiber being configured to amplify the light pulses and to induce a nonlinear spectral broadening of said seed light pulses through Self-Phase Modulation.

15. The LMA optical fiber according to claim 13, said LMA optical fiber being counter-pumped.

16. The LMA optical fiber according to claim 13, wherein the core has a refractive index $n_1$ and the cladding structure comprises, concentrically from the core outwards:
a depressed-index cladding layer having a refractive index $n_2$;
an inner cladding having a refractive index $n_3$; and
an outer cladding having a refractive index $n_4$;
wherein $n_4 < n_2 < n_3 < n_1$.

17. The LMA optical fiber according to claim 13, further comprising stress-applying rods extending longitudinally within the cladding structure in parallel to the core.

* * * * *